United States Patent
Lee et al.

(10) Patent No.: US 10,424,869 B2
(45) Date of Patent: Sep. 24, 2019

(54) LEAD WIRE CONNECTOR AND SOLENOID VALVE INCLUDING SAME

(71) Applicant: UNICK CORPORATION, Gimhae-si, Gyeongsangnam-do (KR)

(72) Inventors: Chang-Hoon Lee, Gimhae-si (KR); Kuk-Chan Moon, Busan (KR); Ji-Hoon Park, Busan (KR); Mun-Hak Kim, Busan (KR); Jun-Hyo Park, Busan (KR)

(73) Assignee: UNICK CORPORATION, Gimhae-si, Gyeongsangnam-do (KR)

( * ) Notice: Subject to any disclaimer, the term of this patent is extended or adjusted under 35 U.S.C. 154(b) by 0 days.

(21) Appl. No.: 15/541,894

(22) PCT Filed: Oct. 8, 2015

(86) PCT No.: PCT/KR2015/010670
§ 371 (c)(1),
(2) Date: Jul. 6, 2017

(87) PCT Pub. No.: WO2016/111442
PCT Pub. Date: Jul. 14, 2016

(65) Prior Publication Data
US 2018/0006397 A1    Jan. 4, 2018

(30) Foreign Application Priority Data

Jan. 7, 2015  (KR) ........................ 10-2015-0001779

(51) Int. Cl.
*H01R 13/60*      (2006.01)
*F16K 31/06*      (2006.01)
(Continued)

(52) U.S. Cl.
CPC ............. *H01R 13/60* (2013.01); *F16K 31/06* (2013.01); *F16K 31/0675* (2013.01); *H01F 7/06* (2013.01);
(Continued)

(58) Field of Classification Search
CPC . H01R 13/60; F16K 31/0675; F16K 13/5213; F15B 13/0817; F15B 13/0832;
(Continued)

(56) References Cited

U.S. PATENT DOCUMENTS 6,142,182 A * 11/2000 Akimoto ............. F15B 13/0817
                                              137/625.64
6,846,198 B1 * 1/2005 Rasmussen ......... F15B 13/0828
                                              439/502

(Continued)

FOREIGN PATENT DOCUMENTS

EP    2 800 208 A1   11/2014
JP    62-170470 U     1/1989
(Continued)

OTHER PUBLICATIONS

International Search Report for PCT/KR2015/010670 dated Dec. 7, 2015.
(Continued)

*Primary Examiner* — Mang Tin Bik Lian
(74) *Attorney, Agent, or Firm* — Hauptman Ham, LLP

(57) ABSTRACT

The present inventive concept relates to a lead wire connector and a solenoid valve including the same, the lead wire connector preventing the inflow of foreign substances containing water, facilitating a layout design for coupling and separation, and being conveniently transported and stored. The lead wire connector comprises: an insulation block protruding to the outside of a solenoid; a power terminal provided inside the insulation block and electrically con- (Continued)

nected to the solenoid; a lead wire connected to the power terminal and extended to the outside of the insulation block; a wire tube encompassing at least a part of the lead wire; and a connector provided at the end of the lead wire. In addition, the solenoid valve includes the solenoid operated according to whether electric power is applied thereto.

1 Claim, 8 Drawing Sheets

(51) Int. Cl.
 *H01R 13/52* (2006.01)
 *H01F 7/06* (2006.01)
(52) U.S. Cl.
 CPC ... *H01R 13/5213* (2013.01); *H01F 2007/062* (2013.01)
(58) Field of Classification Search
 CPC .............. F15B 13/0853; F15B 13/0857; F15B 13/0864; F15B 13/0875
 USPC ............ 336/107, 192, 198; 439/620.21, 909, 439/626, 685, 559, 749, 402, 34; 251/129.15, 129.01, 129.09, 146–148; 251/179, 183, 299, 308; 361/296; 137/625.64, 884, 271
 See application file for complete search history.

(56) References Cited

U.S. PATENT DOCUMENTS 7,703,709 B2 * 4/2010 Akabane .............. F02M 51/005
 239/585.1

2004/0114303 A1  6/2004 Kawamura et al.
2012/0292542 A1 * 11/2012 Mizui .................... F16K 31/06
 251/129.15

FOREIGN PATENT DOCUMENTS

| | | |
|---|---|---|
| JP | 06-022907 A | 2/1994 |
| JP | 06062507 U | 9/1994 |
| JP | 08-033153 A | 2/1996 |
| JP | 10-241930 A | 9/1998 |
| JP | 10241930 A * | 9/1998 |
| JP | 2000-269028 A | 9/2000 |
| JP | 2009-021452 A | 1/2009 |
| JP | 2011-165878 A | 8/2011 |
| KR | 100774149 B1 | 11/2007 |
| KR | 1020110027040 A | 3/2011 |
| KR | 1020110110204 A | 10/2011 |
| KR | 1020120101319 A | 9/2012 |
| KR | 10-1460633 B1 | 11/2014 |
| KR | 101457350 B1 | 11/2014 |

OTHER PUBLICATIONS

Japanese Office Action dated Jul. 27, 2018, issued in corresponding Japanese Patent Application Na 2017-535993.
European Search Report dated Aug. 17, 2018, issued in corresponding European Patent Application No. 15877162.6.
Chinese Office Action dated Oct. 15, 2018, issued in corresponding Chinese Patent Application No. 201580072848.8.

* cited by examiner

LEAD WIRE CONNECTOR AND SOLENOID VALVE INCLUDING SAME

CROSS REFERENCE TO RELATED APPLICATION

This present application is a national stage filing under 35 U.S.C § 371 of PCT application number PCT/KR2015/010670 filed on Oct. 8, 2015 which is based upon and claims the benefit of priority to Korean Patent Application No. 10-2015-0001779 filed on Jan. 7, 2015 in the Korean Intellectual Property Office. The disclosures of the above-listed applications are hereby incorporated by reference herein in their entirety.

TECHNICAL FIELD

The present disclosure relates to a lead wire connector and a solenoid valve including the same, and more particularly, to a lead wire connector which may prevent the inflow of foreign substances containing water, may facilitate a layout design for coupling and separation, and may be conveniently transported and stored, and a solenoid valve including the same.

BACKGROUND ART

Engines are devices to generate mechanical power by combusting fuel. Engines may include 2-stroke cycle engines, 4-stroke cycle engines, rotary engines, etc. according to an operating method. An engine may be provided with an oil pump for circulating a lubricant and a relief valve for preventing the pressure of the lubricant ejected from the oil pump from being overly increased.

Transmissions are devices to convert the power generated by an engine to a rotation force according to a speed and transfer the rotation force to other parts. Transmissions may include manual transmissions, in which a speed change process is manually performed by a driver, and automatic transmissions, in which the speed change process is automatically performed according to a certain pattern. Among these transmissions, an automatic transmission may include torque converters, operating mechanisms, planetary gear devices, electronic control devices, hydraulic control mechanisms, etc. A hydraulic control mechanism is provided with a hydraulic control valve for constantly maintaining an oil pressure in the automatic transmission.

Solenoid valves are devices to supply oil to a specific location or control the pressure of the supplied oil, that is, a hydraulic pressure, by being automatically opened or closed according to the application of electric power. The solenoid valve is used as a relief valve of the oil pump or a hydraulic control valve of a hydraulic control mechanism, and may be classified into a spool type, a ball type, or a poppet type according to an internal structure.

Korean Patent Publication Nos. 2011-0110204 (2011.10.06.) and 2012-0101319 (2012.09.13.) disclose various types of solenoid valves.

The former solenoid valve may include a value for controlling oil and a solenoid for operating the valve. A connector that is a power connection part is provided on an upper end of the solenoid.

The above-described solenoid valve has a structure in which the valve is inserted in a device (engine or transmission). In other words, since the solenoid and the connector are exposed to the outside of the device during installation of the solenoid valve, foreign substances containing water may flow into the solenoid via the connector. In particular, when an opening part of the connector faces upward, raindrops flowing down along a lead wire connected to the connector may be easily flow into the solenoid.

The above problem may be identically applied to the latter hydraulic valve, in which the connector protrudes from a lateral side of the solenoid, and thus a structure to prevent intrusion of the foreign substances containing water is needed.

Furthermore, in a conventional solenoid valve (hydraulic valve), since at least part of the device protrudes to the outside of the device as described above, space for coupling and separation of the connector is needed. Accordingly, a layout design of an engine room may be difficult.

DISCLOSURE

Technical Problem

It is an object of the present disclosure to provide a lead wire connector capable of preventing the inflow of foreign substances containing water, facilitating a layout design for coupling and separation, and being conveniently transported and stored, and a solenoid valve including the same.

Technical Solution

In accordance with one aspect of the present disclosure, the lead wire connector comprises: an insulation block protruding to the outside of a solenoid; a power terminal provided inside the insulation block and electrically connected to the solenoid; a lead wire connected to the power terminal and extended to the outside of the insulation block; a wire tube encompassing at least a part of the lead wire; and a connector provided at the end of the lead wire. In addition, the solenoid valve includes the solenoid operated according to whether electric power is applied thereto.

Advantageous Effects

According to the present disclosure, since a lead wire is provided between a solenoid and a connector, the location of the connector may be freely changed. Accordingly, during a layout design of an engine room, coupling or separation of the connector may not be affected even when an installation space of the solenoid is rather small.

Furthermore, since the lead wire according to the present disclosure is bent in a U shape at the outside of an insulation block, even if water is formed on the lead wire, the water drops from a bending portion, and thus the water may be prevented from flowing into the insulation block. In particular, when epoxy is coated on one end of the insulation block from which the lead wire is drawn, the inflow of water may be surely prevented.

Furthermore, since the lead wire according to the present disclosure is bent in a U shape and is attached and fixed to an outer wall of the insulation block, volume of the connector may be reduced, and thus the connector may be easily transported and stored.

Figure 1:
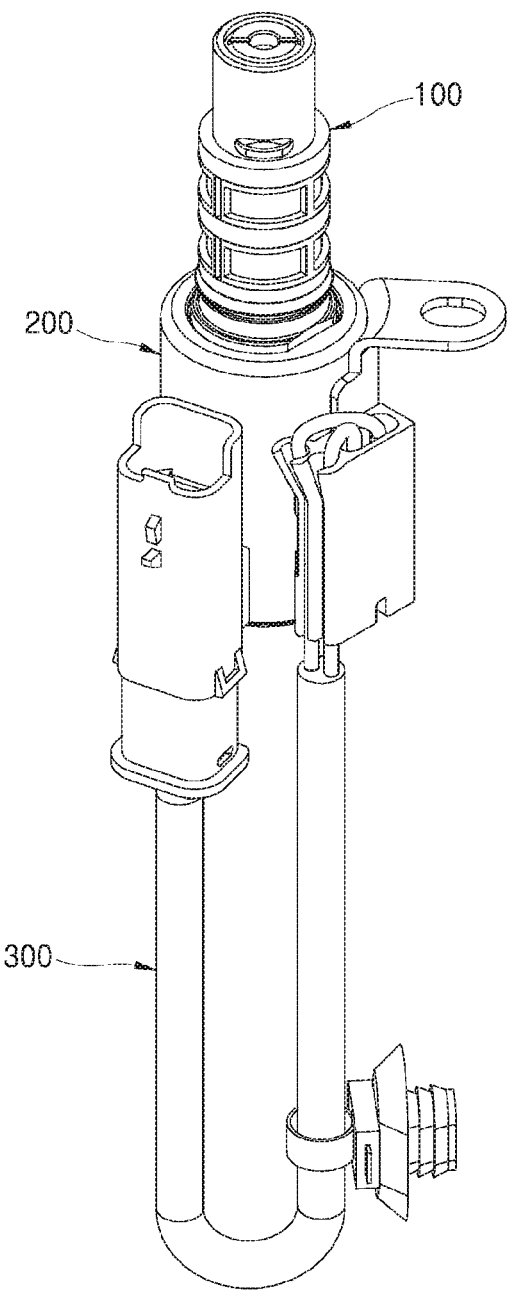
FIG. 1 is a perspective view of a solenoid valve including a lead wire connector according to an embodiment of the present disclosure.

| | |
|---|---|
| 100: valve | 200: solenoid |
| 300: lead wire connector | 310: insulation block |
| 312: path | 314: insertion groove |
| 320: power terminal | 330: lead wire |
| 340: wire tube | 350: connector |
| 360: hooking device | 362: hooking piece |
| 364: hooking groove | |

BEST MODEL

The present inventive concept will now be described more fully with reference to the accompanying drawings, in which embodiments of the inventive concept are shown. In the following description, when detailed descriptions about related well-known functions or structures are determined to make the gist of the present inventive concept unclear, the detailed descriptions will be omitted herein. Throughout the drawings, like reference numerals denote like elements.

Figure 2:
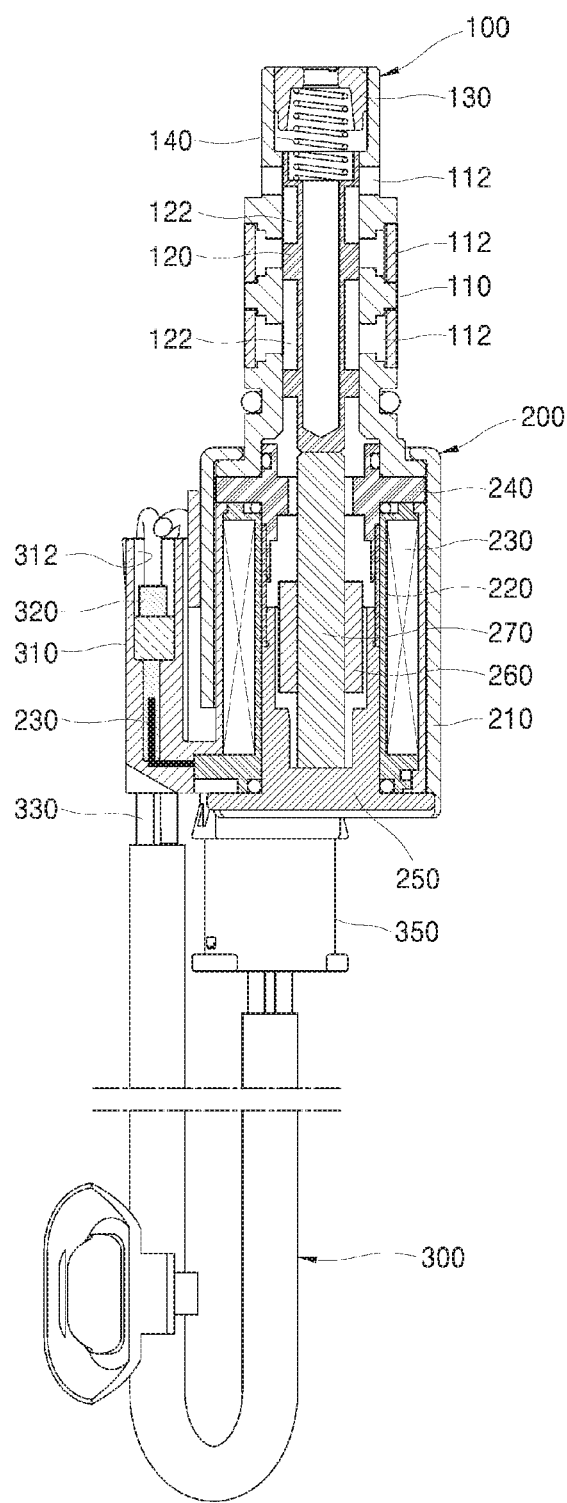
FIG. 2 is a cross-sectional view of a solenoid valve including a lead wire connector according to an embodiment of the present disclosure.

As illustrated in FIGS. 1 and 2, a solenoid valve according to an embodiment of the present disclosure may include a valve 100 for regulating entrance of oil, a solenoid 200 for operating the valve 100, and a lead wire connector 300 for supplying electric power to the solenoid 200. The present disclosure is to facilitate a layout design of an engine room by improving the structure of the lead wire connector 300 and prevent the inflow of foreign substances containing water. The valve 100 and the solenoid 200 are briefly described below.

The valve 100 may include a holder 110, a spool 120 movably arranged in the holder 110, a pressure adjustment screw 130 coupled to an upper portion of the spool 120, a spring 140 provided between the spool 120 and the pressure adjustment screw 130.

The holder 110 has a hollow pipe shape, and a plurality of ports 112 are formed on an outer circumferential surface of the holder 110. The spool 120 has a rod shape having a certain length, and a connection groove 122 for selectively connecting the ports 112 is formed on an outer circumferential surface of the spool 120. The pressure adjustment screw 130 is screw-coupled to an upper portion of the holder 110 to limit a movement of the spool 120. Accordingly, as an amount of opening of the port 112 is adjusted, the pressure of oil discharged to the outside may be adjusted. The spring 140 is an elastic body that elastically supports the spool 120 downward and absorbs shocks generated during a movement of the spool 120.

The solenoid 200 may include a case 210, a bobbin 220 arranged in the case 210, a coil 230 wound around an outer circumferential surface of the bobbin 220, fixed iron cores 240 and 250 respectively coupled to an upper portion and a lower portion of the bobbin 220 and partially inserted into the bobbin 220, a movable iron core 260 movably arranged inside the bobbin 220, and a rod 270 coupled to the movable iron core 260 by penetrating through the same.

The fixed iron cores 240 and 250 may include a core 240 coupled to the upper portion of the bobbin 220 and a yoke 250 coupled to the lower portion of the bobbin 220. During application of electric power, the core 240 and the yoke 250 induce a magnetic field generated from the coil 230 to move the movable iron core 260.

Although in the present embodiment the structures of the valve 100 and the solenoid 200 are presented as described above, the present disclosure is not limited thereto and various structures of the valve 100 and the solenoid 200 may be employed.

Figure 3:
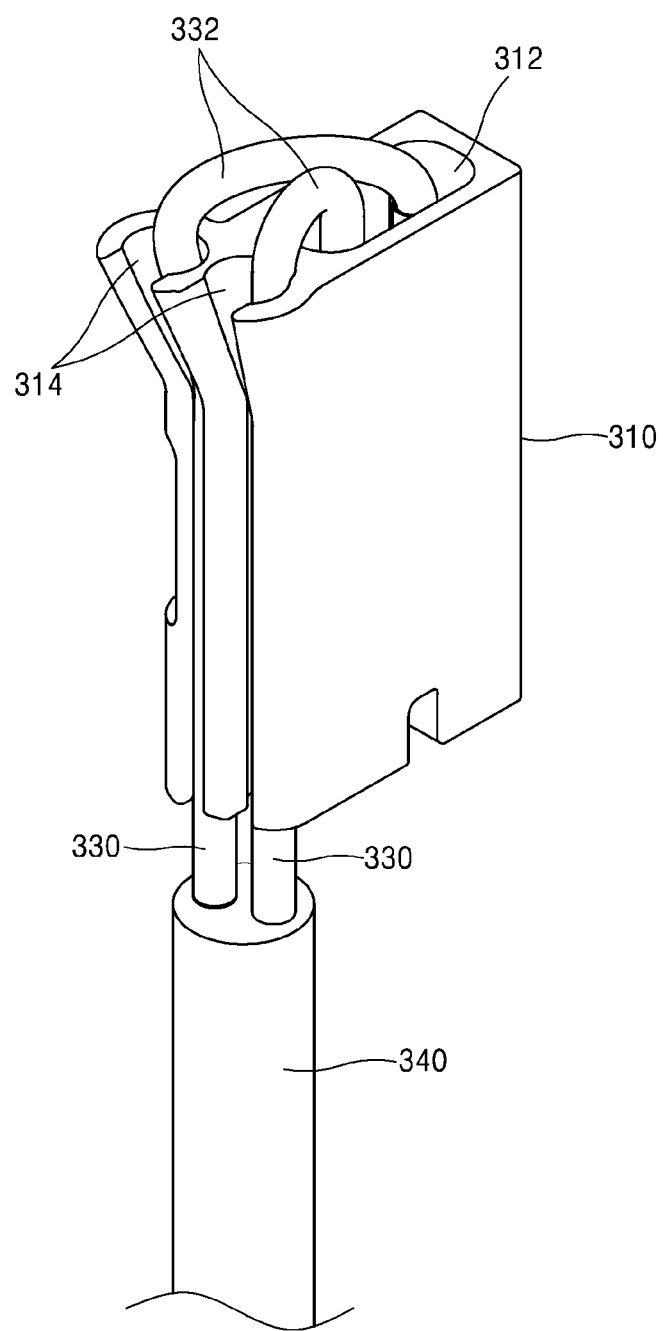
FIG. 3 is an enlarged view of a lead wire connector according to an embodiment of the present disclosure.

As illustrated in FIGS. 2 and 3, the lead wire connector 300 may include an insulation block 310 provided at one side of the bobbin 220 and protruding to the outside of the case 210, a power terminal 320 provided in the insulation block 310 and electrically connected to the coil 230, a lead wire 330 connected to the power terminal 320 and extending to the outside of the insulation block 310, a wire tube 340 encompassing at least part of the lead wire 330, and a connector 350 provided at one end of the lead wire 330.

The insulation block 310 protects the power terminal 320 that is a connection portion of the coil 230 and the lead wire 330. The insulation block 310 protrudes from one side of a lower end of the bobbin 220 to the outside of the case 210, and has a shape extending from the lower end of the case 210 to an upper end thereof. In detail, the insulation block 310 has a rectangular section and has a rectangular shape extending long in a vertical direction. A path 312, in which an end portion of the coil 230 and an end portion of the lead wire 330 are inserted, is formed in the insulation block 310. The power terminal 320 connecting the coil 230 and the lead wire 330 is provided in the middle of the path 312. An insertion groove 314, to which the lead wire 330 is attached and fixed, is formed outside the insulation block 310.

The insertion groove 314 is to allow the lead wire 330 to be attached and fixed to the insulation block 310 such that the lead wire 330 extending out of the insulation block 310 may be bent in a U shape. At least part of the insertion groove 314 is open to insert the lead wire 330 therein, and is formed on an outer wall of the insulation block 310 and has a shape extending in the lengthwise direction of the insulation block 310.

The power terminal 320 is a terminal having a general shape and electrically connecting the coil 230 and the lead wire 330. In other words, the power terminal 320 is provided as a pair: one at an end portion of the coil 230 and the other at an end portion of the lead wire 330. The power terminal 320 may include a female terminal and a mail terminal that may be coupled to or separated from each other according to a user demand.

The lead wire 330 is an electric wire that electrically connects the coil 230 and the connector 350. As described above, the lead wire 330 is bent in a U shape outside the insulation block 310 and is attached and fixed to the insulation block 310. When the lead wire 330 is bent in a U shape, water formed on the lead wire 330 drops from a bending portion and does not flow into the insulation block 310. In detail, the solenoid valve according to the present embodiment is installed such that the valve 100 faces downward. Accordingly, even when water formed on the lead wire 330 flows along the wire tube 340, the water drops from the bending portion (332 of FIG. 3) of the wire tube 340, the inflow of the water into the insulation block 310 may be prevented. In particular, when the path 312 of the insulation block 310, in which the lead wire 330 is inserted, is coated with epoxy, the inflow of water may be surely prevented.

The wire tube 340 is a tube for prevent the lead wire 330 from being abraded due to contact of other part and wires in the engine room. The wire tube 340 is a braided tube exhibiting superior insulation and heat resistance, excellent mechanical strength, and flexibility.

The connector 350 is to supply electric power to the solenoid valve and is connected to a wire harness provided in the engine room.

Figure 4:
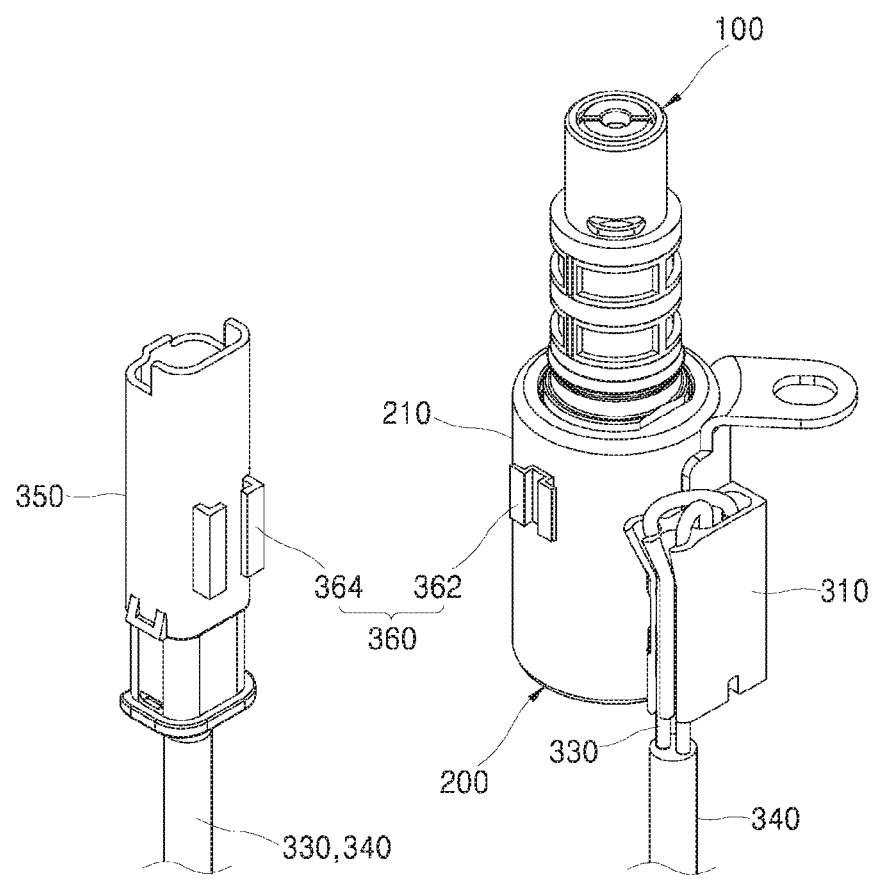
FIG. 4 illustrates a hooking device of a solenoid valve including a lead wire connector according to an embodiment of the present disclosure.

As illustrated in FIG. 4, the lead wire connector 300 according to the present embodiment may further include a hooking device 360 for fixing the connector 350 to reduce volume during transport and storing. The hooking device 360 may include a hooking piece 362 provided on an outer wall of the case 210 and a hooking groove 364 formed on an outer wall of the connector 350.

When the hooking piece 362 and the hooking groove 364 are in use, since the connector 350 is attached and fixed to the case 210 the volume of the lead wire connector 300 may be reduced, and thus transport and storing of the lead wire connector 300 may be easy.

Figure 5:
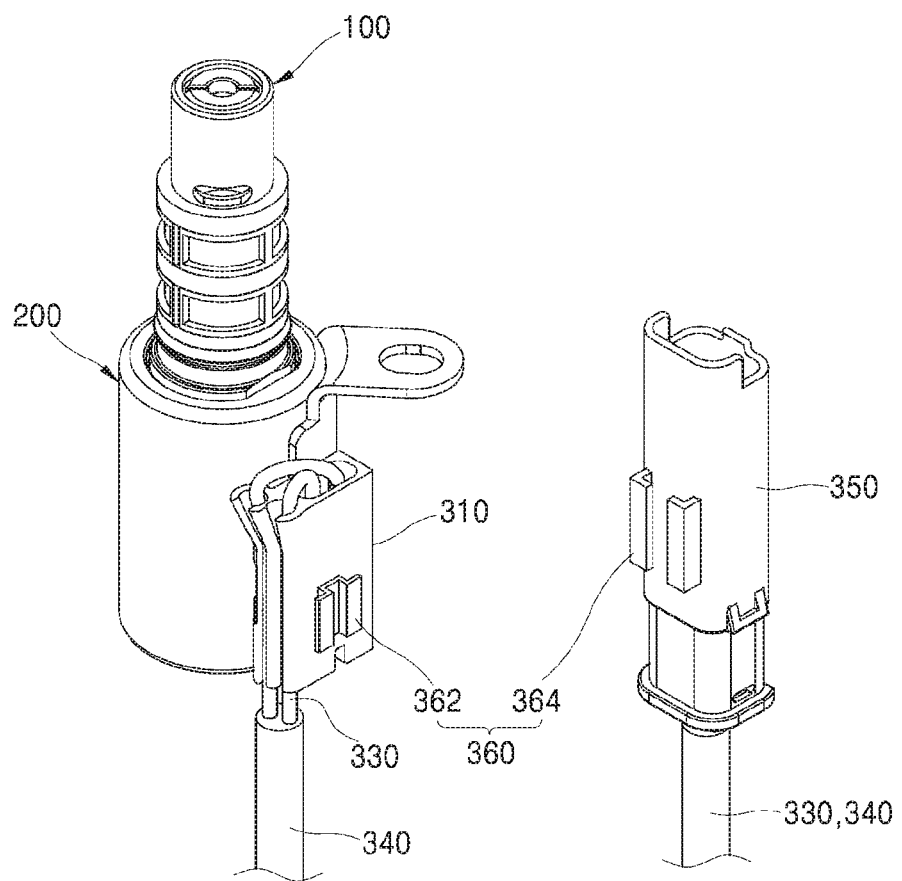
FIGS. 5 and 6 illustrate a lead wire connector according to an embodiment of the present disclosure.
Figure 6:
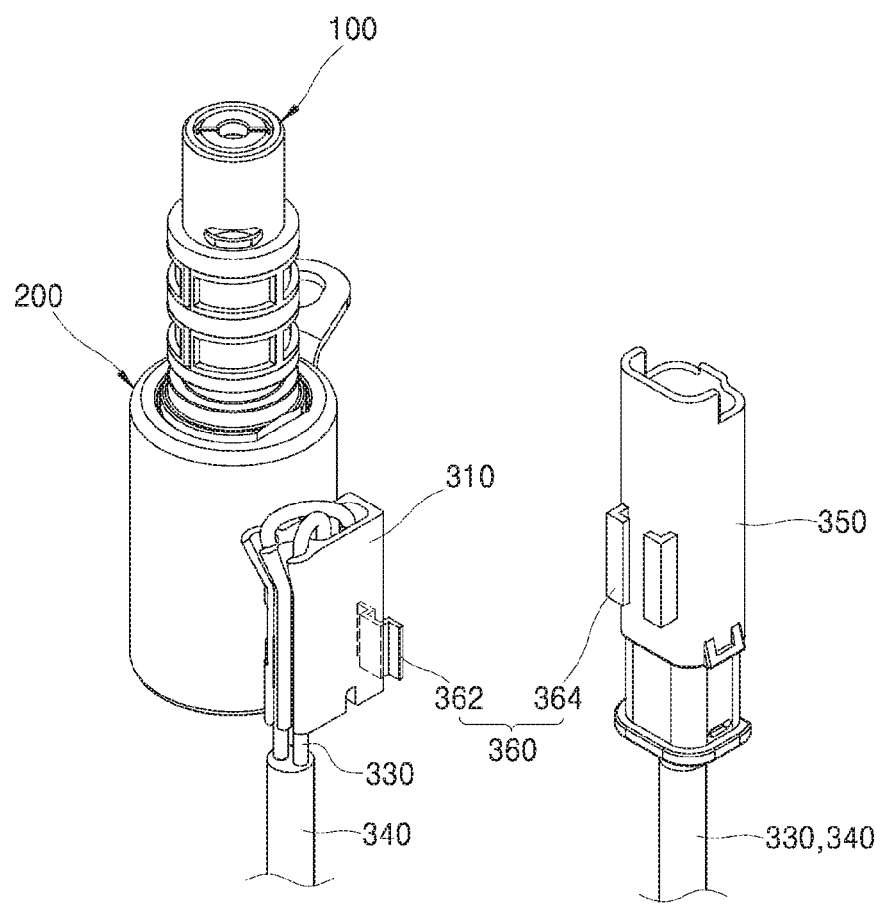

Although in the present embodiment the connector 350 is attached to the case 210, the present disclosure is not limited thereto and, as illustrated in FIGS. 5 and 6, the connector 350 may be attached and fixed to the insulation block 310. In other words, the hooking piece 362 may be provided on the outer wall of the insulation block 310, and the hooking groove 364 may be formed on the outer wall of the connector 350.

Figure 7:
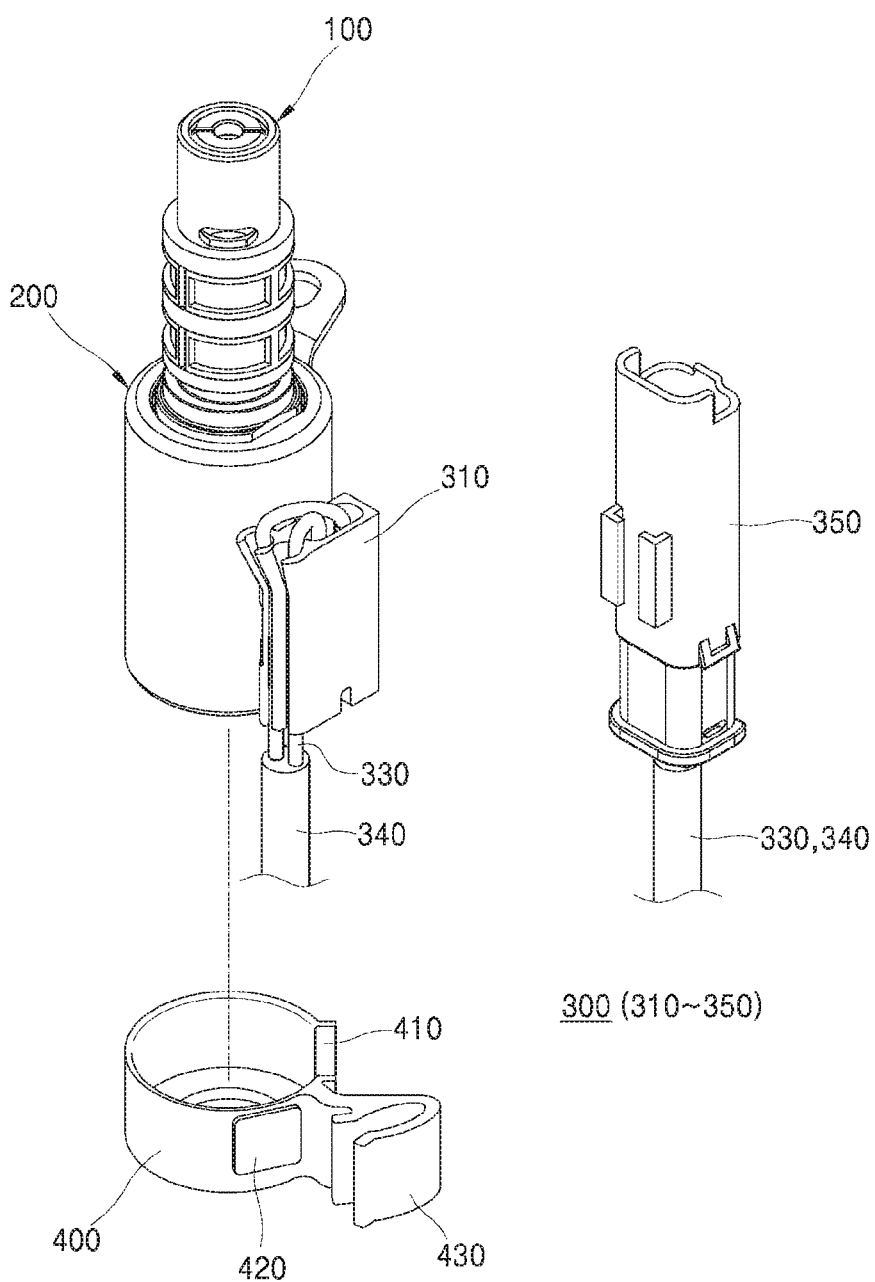
FIG. 7 is an exploded perspective view of a solenoid valve including a lead wire connector according to another embodiment of the present disclosure.

As illustrated in FIG. 7, a solenoid valve according to another embodiment of the present disclosure may include the valve 100 for regulating entrance of oil, the solenoid 200 for operating the valve 100, the lead wire connector 300 for supplying electric power to the solenoid 200 and a cap 400 for fixing the lead wire connector 300 to the solenoid 200.

Since the valve 100, the solenoid 200, and the lead wire connector 300 of the present embodiment are the same as those of the above-described embodiment, detailed descriptions of the elements are omitted.

The cap 400 has a pipe shape and is coupled to a lower end of the solenoid 200. In detail, the cap 400 has a cylindrical shape with a partially closed lower side to prevent passing of the lower end of the solenoid 200 inserted in the cap 400.

A groove 410 and a hooking piece 420 are formed at a side surface of the cap 400, and a band 430 protrudes between the groove 410 and the hooking piece 420. The groove 410 is a portion in which the insulation block 310 protruding to the outside of the solenoid 200 during installation of the cap 400 is inserted, and the hooking piece 420 is a portion to attach and fix the connector 350. Furthermore, the band 430 is a portion in which the lead wire 330 and the wire tube 340 are inserted when the connector 350 is attached and fixed. Since the hooking piece 420 and the band 430 reduce the volume of the lead wire connector 300, the transport and storing of the lead wire connector 300 is made easy.

Figure 8:
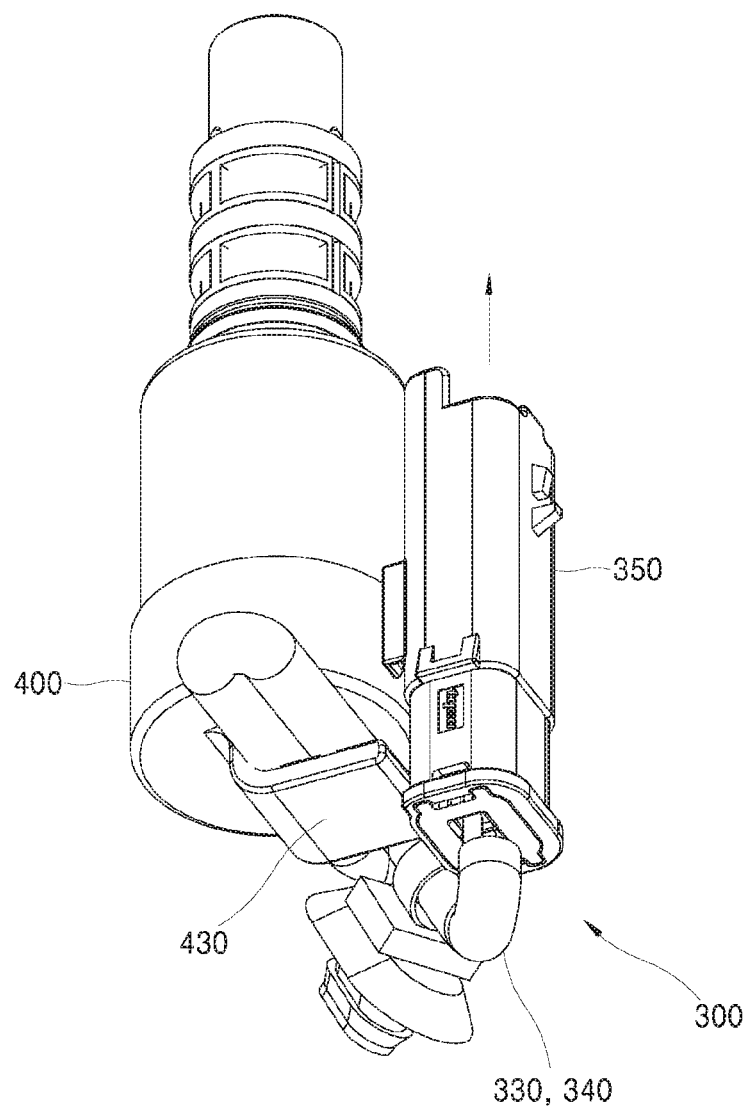
FIG. 8 illustrates a modified example of a lead wire connector according to another embodiment of the present disclosure.

FIG. 8 illustrates a modified example of the lead wire connector 300 including the cap 400. The band 430 for fixing the lead wire 330 and the wire tube 340 is provided at the bottom of the cap 400. Although not illustrated, a groove in which the insulation block 310 is inserted and a hooking piece for attaching the connector 350 are formed at side surface of the cap 400.

According to the above-described structure, the lead wire 330 and the wire tube 340 are inserted in the band 430, thereby reducing the volume of the lead wire connector 300. Accordingly, the solenoid valve including the lead wire connector 300 may be easily transported or kept. In particular, since the connector 350 is located at an opening side of the band 430, the lead wire 330 and the wire tube 340 inserted in the band 430 may be prevented from being freely separated.

Furthermore, according to the above-described embodiments, when the lead wire 330 and the wire tube 340 are inserted in the band 430 and then the connector 350 is pushed or pulled in a direction indicated by an arrow in FIG. 8, the connector 350 is separated from the cap 400 and simultaneously the lead wire 330 and the wire tube 340 inserted in the band 430 is easily detached from the band 430. Accordingly, an operator may easily perform a connector wiring job, and thus work efficiency may be improved.

While the present inventive concept has been particularly shown and described with reference to preferred embodiments using specific terminologies, the embodiments and terminologies should be considered in descriptive sense only and not for purposes of limitation. Therefore, it will be understood by those of ordinary skill in the art that various changes in form and details may be made therein without departing from the spirit and scope of the present inventive concept as defined by the following claims.

The invention claimed is:

1. A lead wire connector for supplying electric power to a solenoid, the lead wire connector comprising:
   an insulation block protruding to the outside of the solenoid;
   a power terminal provided in the insulation block and electrically connected to the solenoid;
   a lead wire connected to the power terminal and extending to the outside of the insulation block;
   a wire tube encompassing at least part of the lead wire;
   the connector provided at an end portion of the lead wire; and
   a cap coupled to an end portion of the solenoid, wherein the cap has a band for wrapping the lead wire,
   wherein one of the cap or the connector has a hooking piece on an outer wall thereof, and the other of the cap or the connector has a hooking groove on an outer wall thereof,
   wherein the insulation block has an insertion groove on an outer wall thereof, and
   wherein the lead wire is bent in a U shape outside the insulation block and is attached and fixed to the outer wall of the insulation block via the insertion groove of the insulation block.

* * * * *